(12) United States Patent
Lundy et al.

(10) Patent No.: US 8,717,283 B1
(45) Date of Patent: May 6, 2014

(54) UTILIZING MOTION OF A DEVICE TO MANIPULATE A DISPLAY SCREEN FEATURE

(75) Inventors: Michael T. Lundy, Olathe, KS (US); Jason K. Whitney, Lee's Summit, MO (US); Robert Brian Landers, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1008 days.

(21) Appl. No.: 12/323,249

(22) Filed: Nov. 25, 2008

(51) Int. Cl.
*G09G 5/00* (2006.01)

(52) U.S. Cl.
USPC ........... 345/156; 345/157; 345/158; 345/160; 345/161; 345/173; 715/700; 715/810; 715/817; 715/821; 715/848

(58) Field of Classification Search
USPC .......... 345/156–173; 715/810, 835, 715, 719, 715/727, 730, 764
See application file for complete search history.

(56) References Cited

U.S. PATENT DOCUMENTS

| | | | | |
|---|---|---|---|---|
| 5,602,566 | A * | 2/1997 | Motosyuku et al. | 345/684 |
| 6,137,468 | A * | 10/2000 | Martinez et al. | 345/649 |
| 6,163,312 | A * | 12/2000 | Furuya | 345/684 |
| 6,201,554 | B1 * | 3/2001 | Lands | 345/169 |
| 6,288,704 | B1 * | 9/2001 | Flack et al. | 345/158 |
| 6,347,290 | B1 * | 2/2002 | Bartlett | 702/150 |
| 6,400,376 | B1 * | 6/2002 | Singh et al. | 345/685 |
| 6,433,793 | B1 * | 8/2002 | Ootsuka | 345/684 |
| 6,466,198 | B1 * | 10/2002 | Feinstein | 345/158 |
| 6,567,101 | B1 * | 5/2003 | Thomas | 345/649 |
| 6,577,296 | B2 * | 6/2003 | Flack | 345/158 |
| 6,798,429 | B2 * | 9/2004 | Bradski | 345/156 |
| 6,847,351 | B2 * | 1/2005 | Noguera | 345/158 |
| 7,002,553 | B2 * | 2/2006 | Shkolnikov | 345/169 |
| 7,271,795 | B2 * | 9/2007 | Bradski | 345/158 |
| 7,351,152 | B2 * | 4/2008 | Abe et al. | 463/43 |
| 7,533,569 | B2 * | 5/2009 | Sheynblat | 73/510 |
| 7,607,111 | B2 * | 10/2009 | Vaananen et al. | 715/864 |
| 7,647,175 | B2 * | 1/2010 | Fateh | 701/220 |
| 7,679,604 | B2 * | 3/2010 | Uhlik et al. | 345/158 |
| 7,764,269 | B2 * | 7/2010 | Sohn et al. | 345/156 |
| 7,827,698 | B2 * | 11/2010 | Jaiswal et al. | 33/366.11 |
| 7,859,516 | B2 * | 12/2010 | Hanyu | 345/158 |
| 8,423,076 | B2 * | 4/2013 | Kim et al. | 455/550.1 |
| 2001/0048423 | A1 * | 12/2001 | Rekimoto | 345/157 |
| 2002/0041291 | A1 | 4/2002 | Vale | |
| 2002/0075335 | A1 * | 6/2002 | Rekimoto | 345/864 |
| 2006/0001649 | A1 | 1/2006 | Rekimoto | |
| 2006/0164382 | A1 * | 7/2006 | Kulas et al. | 345/156 |
| 2007/0066394 | A1 | 3/2007 | Ikeda et al. | |
| 2007/0247439 | A1 | 10/2007 | Daniel et al. | |
| 2008/0034293 | A1 | 2/2008 | Vaananen | |

(Continued)

OTHER PUBLICATIONS

"DoCoMo Phones Swing Wiimote-Style," Apr. 24, 2007, 1 page, www.cnet.co.uk/misc/print/0,39030763,49289918,00.htm.

(Continued)

*Primary Examiner* — Grant Sitta

(57) ABSTRACT

Systems, methods, and computer-readable media, for utilizing device motions to manipulate a display screen feature. One or more motion data that indicate a motion of a device are referenced. Upon referencing motion data, manipulations to apply to a display screen feature are identified. Thereafter, the display screen feature is manipulated in accordance with the one or more manipulations identified.

17 Claims, 13 Drawing Sheets

(56) References Cited

U.S. PATENT DOCUMENTS

| | | |
|---|---|---|
| 2008/0222558 A1 | 9/2008 | Cho et al. |
| 2009/0179857 A1* | 7/2009 | Hsu et al. .................... 345/157 |
| 2010/0123659 A1 | 5/2010 | Beeman et al. |

OTHER PUBLICATIONS

"Samsung Introduces New Motion Recognition Phone," PHYSORG. com, Dec. 3, 2005, 1 page, www.physorg.com/news8705.html.

Jingtao Wang et al., "Camera Phone Based Motion Sensing: Interaction Techniques, Applications and Performance Study," UIST '06, Oct. 15-18, 2006, Montreux, Switzerland, 10 pp.

Non-Final Office Action, mailed Oct. 4, 2010, in U.S. Appl. No. 11/945,054, 16 pp.

Final Office Action, mailed Mar. 1, 2011, in U.S. Appl. No. 11/945,054, 15 pp.

Notice of Allowance, mailed Dec. 3, 2012, in related U.S. Appl. No. 11/945,054, 17 pp.

Non-Final Office Action, mailed Jul. 1, 2011, re U.S. Appl. No. 11/945,054 (16 pgs.).

First Action Interview Pilot program Pre-Interview Communication, mailed Sep. 16, 2011, re U.S. Appl. No. 12/323,258 (6 pp.).

Final Office Action, mailed Nov. 28, 2011, re U.S. Appl. No. 11/945,054 (24 pp.).

Final Office Action, mailed Mar. 22, 2012, U.S. Appl. No. 12/323,258, 14 pp.

Non-Final Office Action, mailed May 22, 2012, in U.S. Appl. No. 11/945,054 (21 pp.).

Non-Final Office Action, in related case, U.S. Appl. No. 12/323,258, mailed Jun. 19, 2013, pp. 1-16.

* cited by examiner

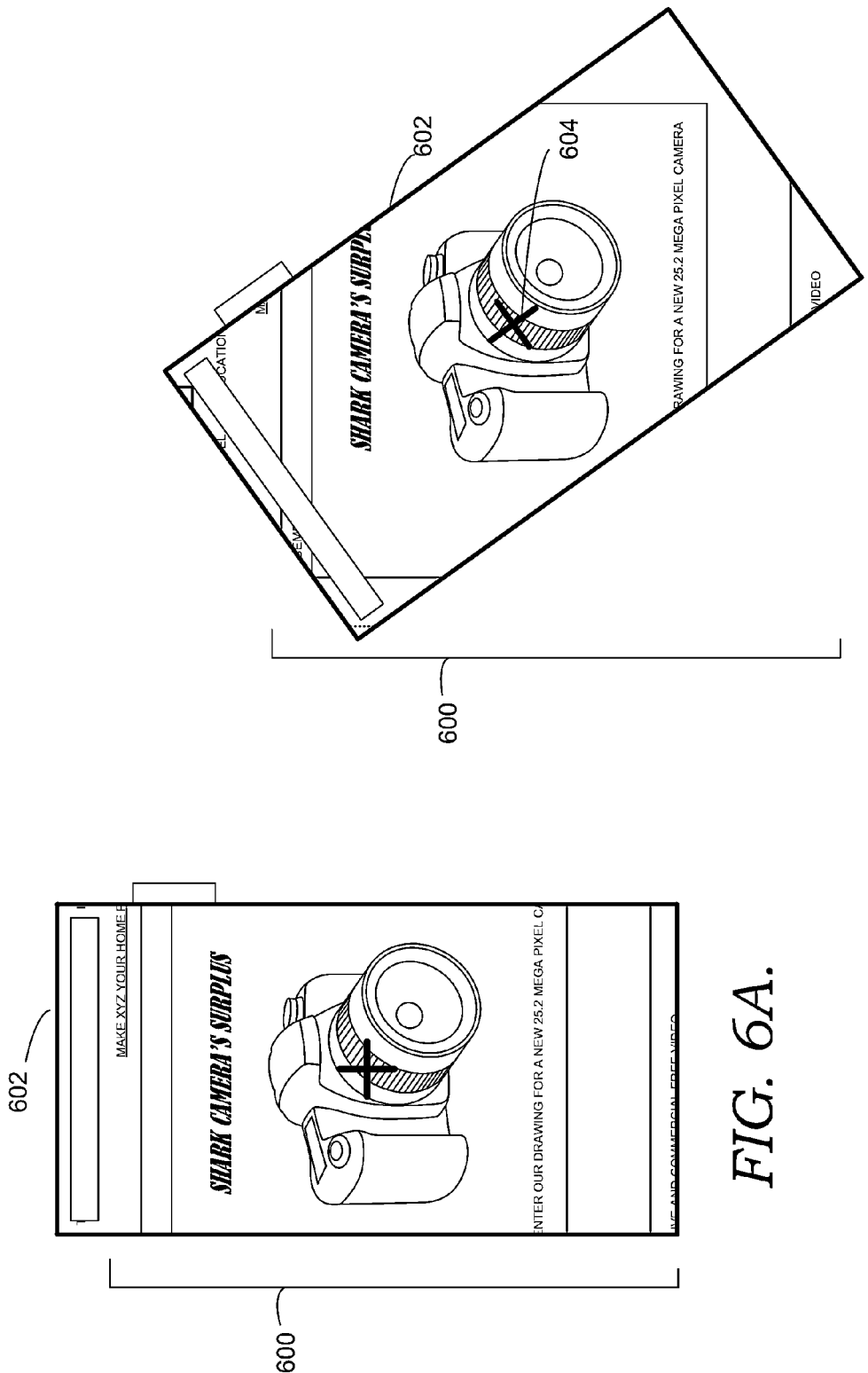

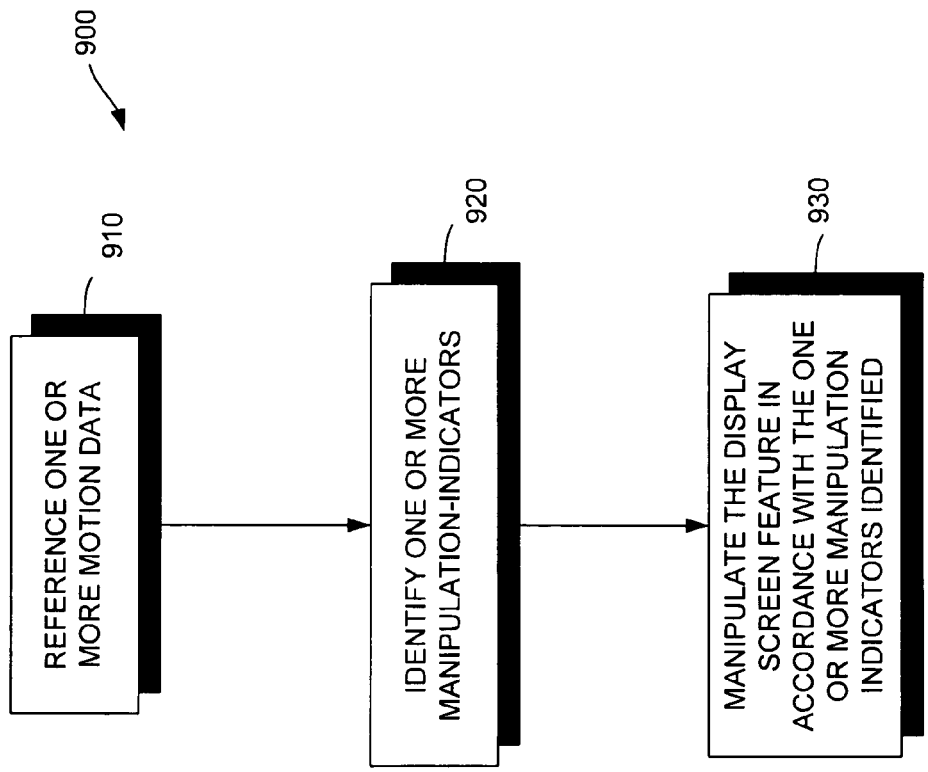

UTILIZING MOTION OF A DEVICE TO MANIPULATE A DISPLAY SCREEN FEATURE

SUMMARY

This Summary is provided to introduce a selection of concepts in a simplified form that are further described below in the Detailed Description. Embodiments of the present invention are defined by the claims below. This Summary is intended to summarize embodiments of the invention and is not intended to limit the scope of the claims in any way.

In embodiments, one or more computer-readable media having computer-useable instructions embodied thereon for performing a method for utilizing device motions to manipulate display screen features. The method includes referencing motion data that provide an indication of a motion of a portable device. Based on the motion data, manipulation indicators to apply to a display screen feature are identified, wherein the display screen feature comprises a feature viewable within a display screen of the portable device. The manipulation indicators provide an indication of a manipulation to apply to a display screen feature so that the display screen feature appears virtually fixed. The display screen feature is manipulated in accordance with the identified manipulation indicators so that the display screen feature appears virtually fixed.

In other embodiments, one or more computer-readable media having computer-useable instructions embodied thereon for performing a method for utilizing device motions to manipulate display screen features. The method includes referencing a current position of a display screen feature, the display screen feature viewable within a display screen of a portable device. Based on one or more motion data, a movement to apply to the display screen feature is identified. The current position of the display screen feature and the movement are utilized to determine a destination to which the display screen feature should be moved. The display screen feature is moved to the destination such that the display screen feature appears virtually fixed upon a device motion.

In still further embodiments, a set of computer-useable instructions provide a method for utilizing device motions to manipulate a display screen feature viewable within a display screen of a portable device. A motion magnitude and a motion direction are referenced, the motion magnitude and motion direction corresponding with a motion of the portable device in three-dimensional space along or about an x-axis, a y-axis, a z-axis, or a combination thereof. The motion magnitude and the motion direction are utilized to identify a manipulation magnitude and a manipulation direction associated with a manipulation to apply to a display screen feature such that the display screen feature appears as though fixed in space while the portable device moves in space, wherein the manipulation magnitude equals the motion magnitude, the manipulation direction opposes the motion direction, and the manipulation comprises a rotational manipulation, a directional manipulation, a zoom manipulation, or a combination thereof. The display screen feature is manipulated in accordance with the manipulation magnitude and the manipulation direction, the display screen feature comprising a three-dimensional content display screen feature.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 6A is a first display of a graphical user interface for applying a content navigational mode based on a rotational device motion, in accordance with an embodiment of the present invention;

FIG. 6B is a second display of a graphical user interface for applying a content navigational mode based on a rotational device motion, in accordance with an embodiment of the present invention;

FIG. 9 is a flow diagram illustrating a first exemplary method for utilizing device motions to manipulate a display screen feature, in accordance with an embodiment of the present invention.

DETAILED DESCRIPTION

Figure 1:
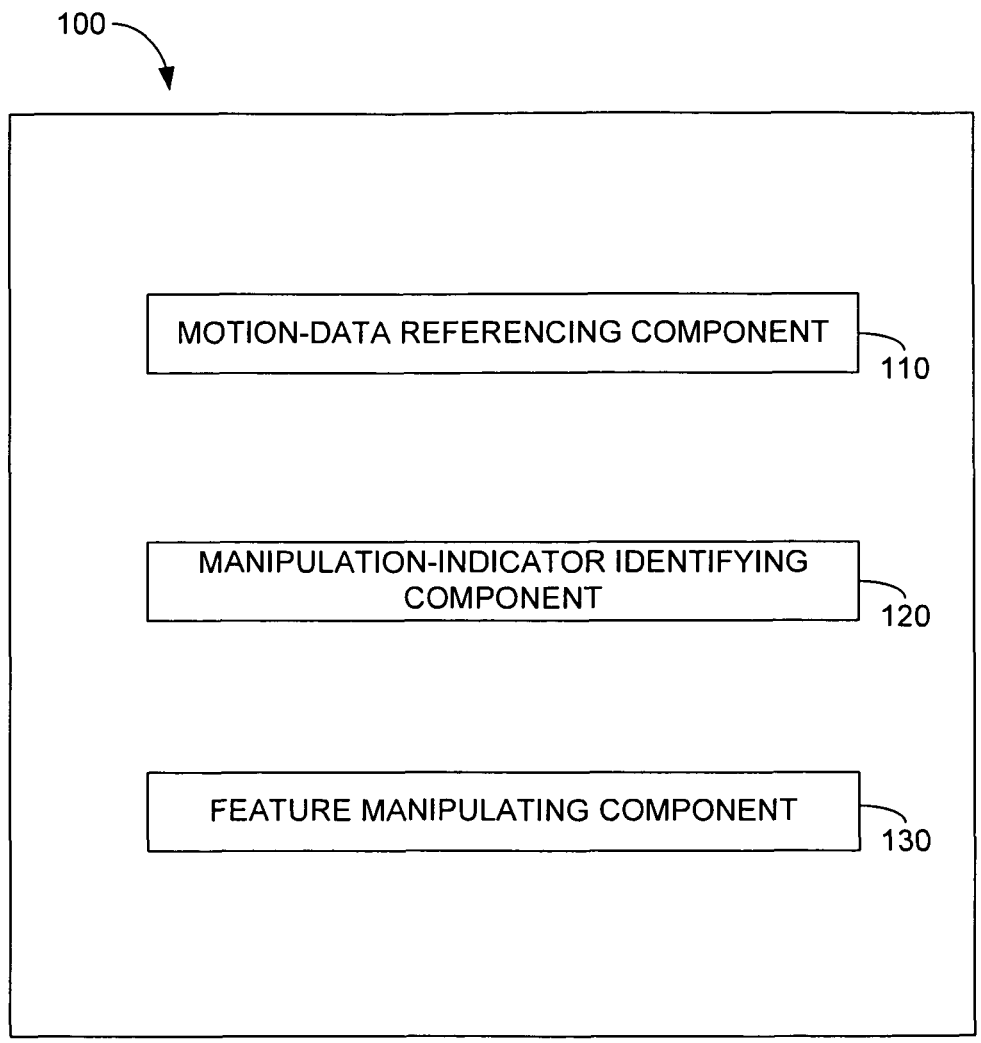
FIG. 1 is a block diagram of an exemplary computer system for utilizing device motions to manipulate a display screen feature, in accordance with an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of the methods employed, the terms should not be interpreted as implying any particular order among or between various steps herein disclosed unless and except when the order of individual steps is explicitly described.

Embodiments of the present invention provide systems, methods, and computer-readable media for utilizing motion of a device to manipulate a display screen feature. Using embodiments hereof, a user can manipulate a display screen, or a portion thereof, utilizing motion of a device associated with the display screen. As such, a user may navigate content presented within a display screen by moving a device in space, i.e., a three-dimensional environment.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

CD Compact Disk
CD-ROM Compact Disk Read Only Memory
DVD Digital Versatile Discs
EEPROM Electrically Erasable Programmable Read Only Memory
GPS Global Positioning System
MP3 MPEG-1 Audio Layer 3
PDA Personal Digital Assistant
RAM Random Access Memory
ROM Read Only Memory As one skilled in the art will appreciate, embodiments of the present invention may be embodied as, among other things, a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Referring to the drawings generally, and initially to FIG. 1 in particular, an exemplary computer system 100 for utilizing a device motion to manipulate a display screen feature is illustrated. A device, as used herein, refers to any portable device associated with a display screen. Such a device may include, for example, a mobile phone, a personal digital assistant (PDA), a CD player, a MP3 player, a dictation device, a video player, a laptop, any combination of these devices, or any other portable device associated with a display screen. A display screen, as used herein, refers to a display screen or monitor that can visually present, display, or output information, such as, for example, images, text, figures, values, symbols, videos, video clips, movies, photographs, lists, data sets, webpages, emails, text messages, or any other content. In one embodiment, a portable device, such as a mobile phone, includes a display screen. That is, a display screen is integrated or coupled with a portable device. One skilled in the art will appreciate that, in another embodiment, a display screen is remote from the portable device. In such a case, the display screen that is remote from the portable device can be manipulated in accordance with a movement applied to and detected by the portable device, or equipment associated therewith.

A device motion, as used herein, refers any motion (i.e., physical or manual movement) applied to and detected by a device or other equipment associated therewith, e.g., an earpiece, a microphone, or the like. A motion applied to a device, or other equipment associated therewith, includes, without limitation, a directional motion, a rotational motion, a gesture motion, a combination thereof, or the like. A directional motion refers to motion along an axis or axes. Such a directional motion may include, for example, a lateral motion (e.g., side-to-side motion), a vertical motion (e.g., up or down motion), a forward motion, and/or a backward motion. A rotational motion refers to any motion about an axis or axes, such as, for example, a yaw, pitch, and/or roll. A gesture motion refers to any motion that indicates a gesture. Such a gesture motion might include, for example, a brisk movement in a specific direction, a device shake, or a movement in a specific pattern.

A device motion can be detected utilizing any motion detectors (e.g., sensors) including, for example, an accelerometer, a gyroscope, a magnetometer, an electronic compass, a global positioning system (GPS), a camera, a hand jitter reduction technology, combinations thereof, or the like. Such motion detectors might detect movement applied to a device along or about an x-axis, a y-axis, and/or a z-axis. That is, any number of degrees of freedom, including six degrees of freedom, can be detected and used to manipulate a display screen feature. Motion detected by a device can be based on an actual motion or a relative motion of the device, e.g., motion of device relative to an object in the environment, such as a vehicle.

A display screen feature refers to any feature viewable within a display screen. In one embodiment, a display screen feature is viewable within a display screen where the display screen feature is presented, in its entirety, within the display screen. Alternatively, a display screen feature is viewable within a display screen where the display screen feature is displayed within the display screen and/or is capable of being displayed within the display screen upon manipulation. That is, initially, a portion of a display screen feature is presented on a display screen feature, but a user can navigate to portions of the display screen feature that are not initially presented, such as, for example, a web page that is larger than the display screen.

A display screen feature can comprise, for example, a selector, focus, and/or content. A selector display screen feature refers to an aspect of a display screen that is used to select selectable items (e.g., hyperlinks, icons), position a cursor, or the like. In one embodiment, a selector display screen feature comprises a pointer or an arrow. A focus display screen feature refers to any feature that focuses on, for example, content within the display screen. That is, a focus display screen feature may be an area of highlighting, pointing, emphasizing (e.g., bolding or enlarging), or outlining such that an area of focus or area of interest is recognizable to a user. A content display screen feature refers to any data viewable via a display screen including, but not limited to, text, a value, a figure, a symbol, a video, a photograph, a document, a webpage, a desktop, an image, a list, a data set, contact information, an email, a text message, a combination thereof, or any other data or object. In one embodiment, a content display screen feature includes an entire document, photograph, webpage, desktop, list, data set, or the like, even though the entire content display screen feature may not be displayed within the display screen at a particular instant. For example, an entire document or webpage may comprise a content display screen feature even though the entire document or webpage is not initially presented to the user within the display screen. One skilled in the art will appreciate that content display screen features can be two-dimensional or three-dimensional (e.g., an object provided by a three-dimensional rendering engine, such as a three-dimensional image or environment). Alternatively, a content display screen feature includes a portion of such data.

In embodiments, a display screen feature is manipulated in response to detecting a device motion. The specific display screen feature (e.g., selector, focus, or content) to be manipulated might be based on a navigational mode applied to a device. A navigational mode, as used herein, refers to any distinct setting or operation that results in manipulation of a specific display screen feature. Such navigational modes enable a user to manipulate a particular display screen feature using device motion so that the user may view content within the display screen. A navigational mode may comprise, for example, a focus navigational mode, a selector navigational mode, a content navigational mode, or the like.

Figure 2A:
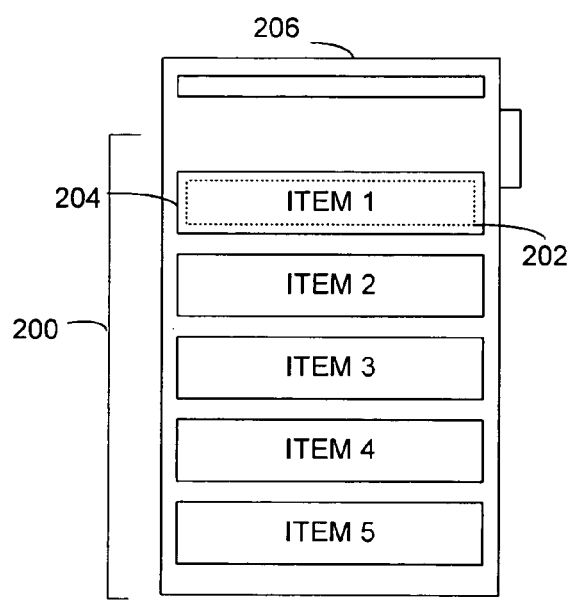
FIG. 2A is a first display of a graphical user interface for applying a focus navigational mode, in accordance with an embodiment of the present invention.
Figure 2B:
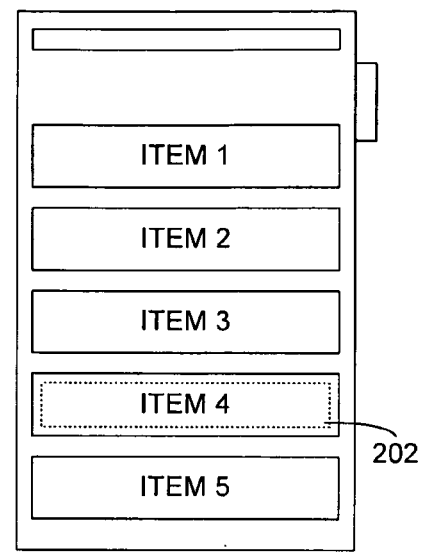
FIG. 2B is a second display of a graphical user interface for applying a focus navigational mode, in accordance with an embodiment of the present invention.

A focus navigational mode maintains a focus display screen feature in a virtually fixed position upon a device motion. That is, a focus navigational mode manipulates a focus display screen feature such that the focus display screen feature appears as though fixed in space while the device moves in space. As such, in instances where a focus navigational mode is applied to a device, a focus display screen feature is manipulated. By way of example only, with reference to FIG. 2A, assume a user views a content display screen feature 200 comprising a vertical list. A focus display screen feature 202 is focused on the first item 204 within the content display screen feature 200. Further assume that a device 206 is moved away from the user while a focus navigational mode is applied to the device 206. As shown in FIG. 2B, the focus display screen feature 202 remains virtually fixed.

Figure 3A:
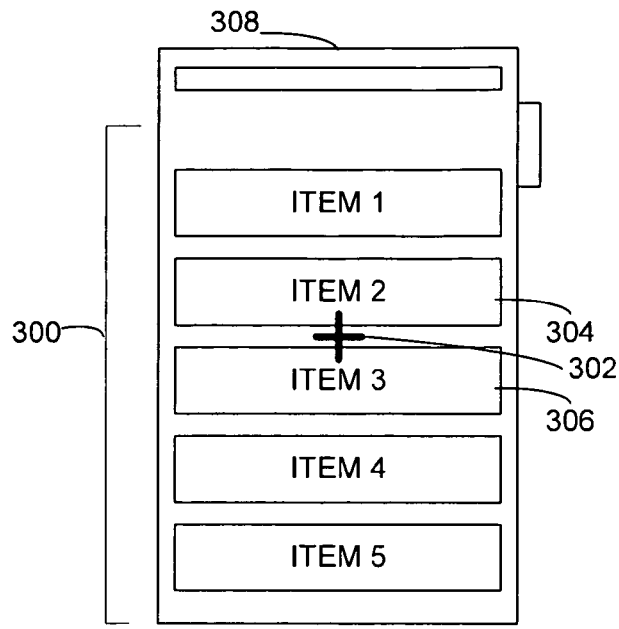
FIG. 3A is a first display of a graphical user interface for applying a selector navigational mode, in accordance with an embodiment of the present invention.
Figure 3B:
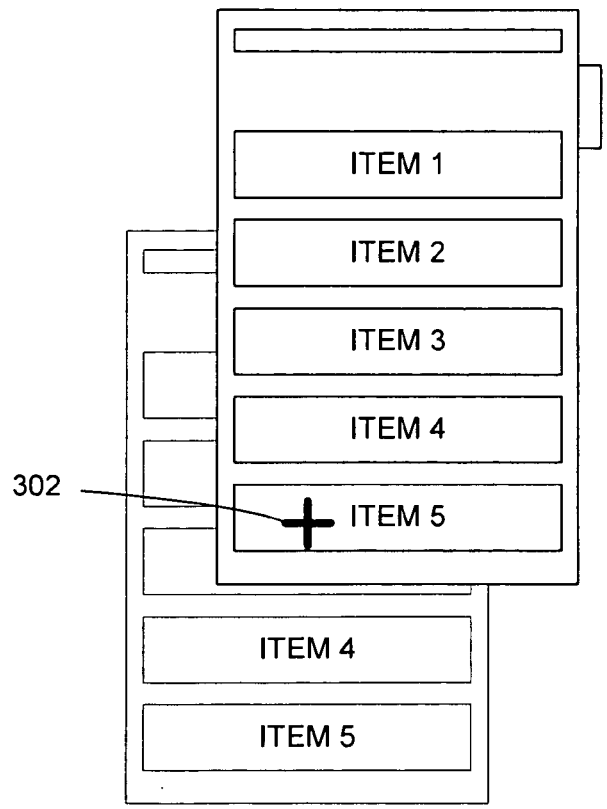
FIG. 3B is a second display of a graphical user interface, in accordance with an embodiment of the present invention, for applying a selector navigational mode.

A selector navigational mode maintains a selector display screen feature in a virtually fixed position upon a device motion. As such, a selector navigational mode manipulates a selector display screen feature such that the selector display screen feature appears as though fixed in space while the device moves in space. Accordingly, in instances where a selector navigational mode is applied to a device, a selector display screen feature is manipulated. By way of example, with reference to FIG. 3A, assume a user views a content display screen feature 300 comprising a vertical list. A selector display screen feature 302 is focused between the second item 304 and the third item 306 within the content display screen feature 300. Further assume the device 308 is moved away from the user and to the right (e.g., along the z-axis and x-axis) while a selector navigational mode is applied to the device 308. As shown in FIG. 3B, the selector display screen feature 302 remains virtually fixed.

A content navigational mode maintains a content display screen feature in a virtually fixed position upon a device motion. That is, a content navigational mode manipulates a content display screen feature such that the content display screen feature appears as though fixed in space while the device moves in space. As such, in instances where a content navigational mode is applied to a device, a content display screen feature is manipulated.

Figure 4A:
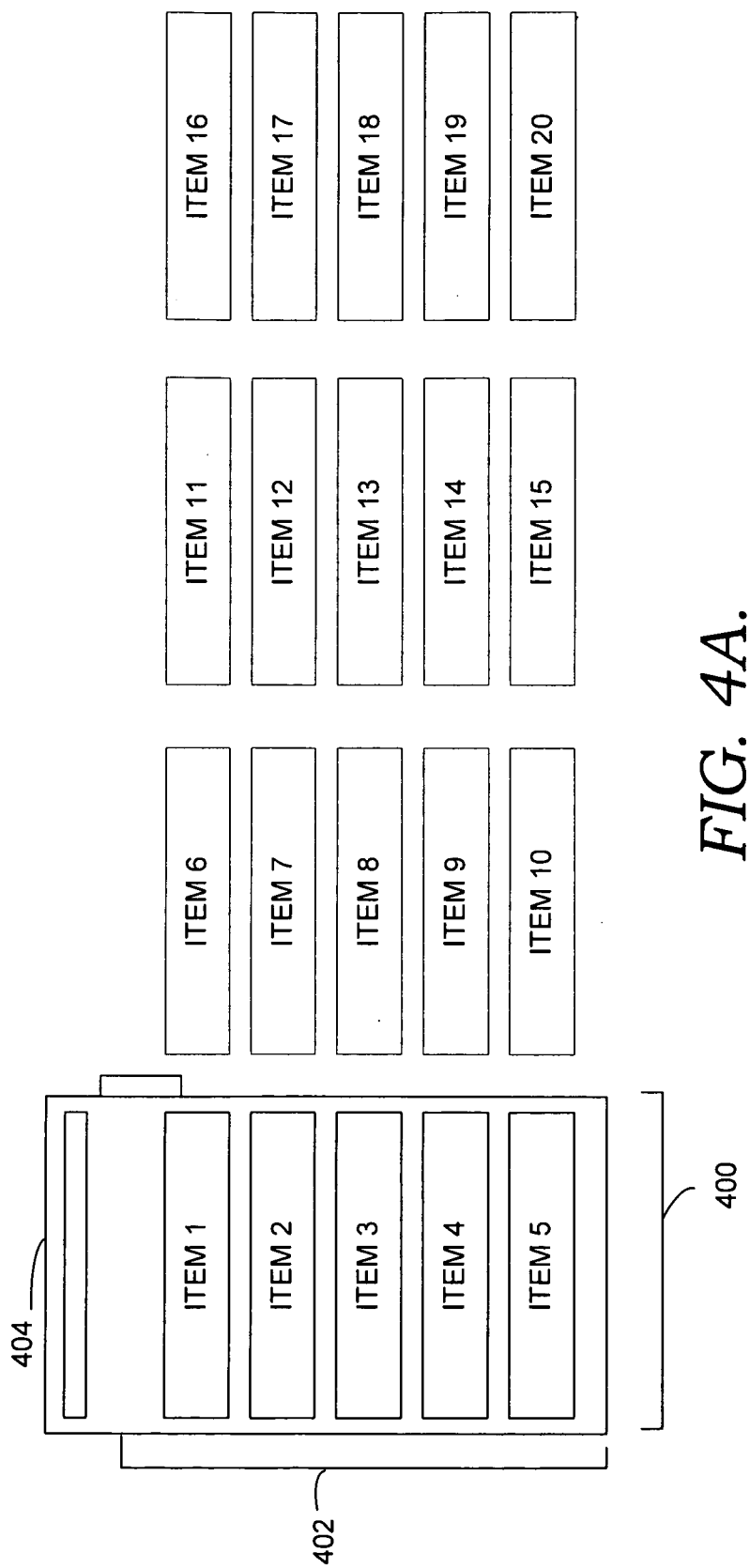
FIG. 4A is a first display of a graphical user interface for applying a content navigational mode, in accordance with an embodiment of the present invention.
Figure 4B:
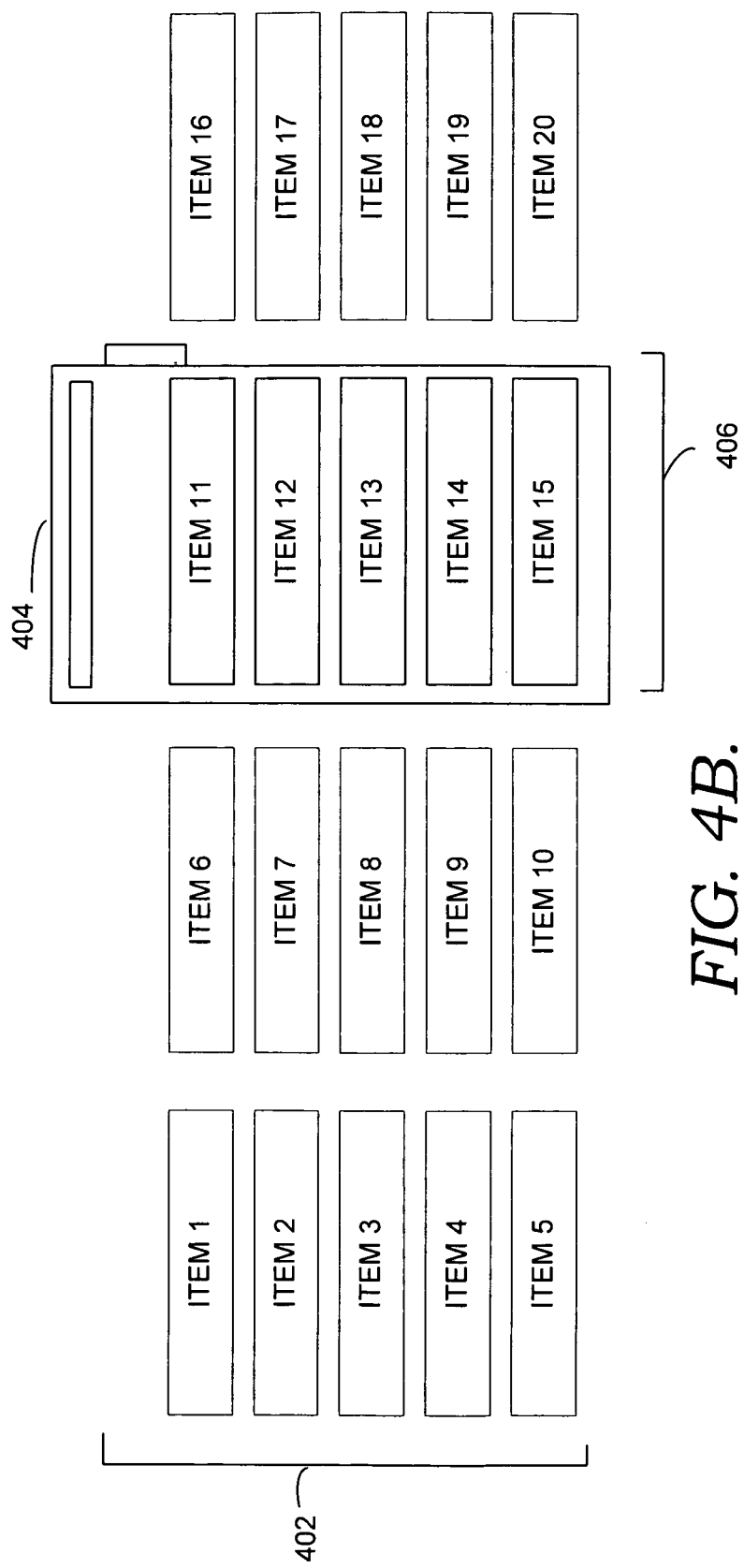
FIG. 4B is a second display of a graphical user interface for applying a content navigational mode, in accordance with an embodiment of the present invention.
Figure 5:
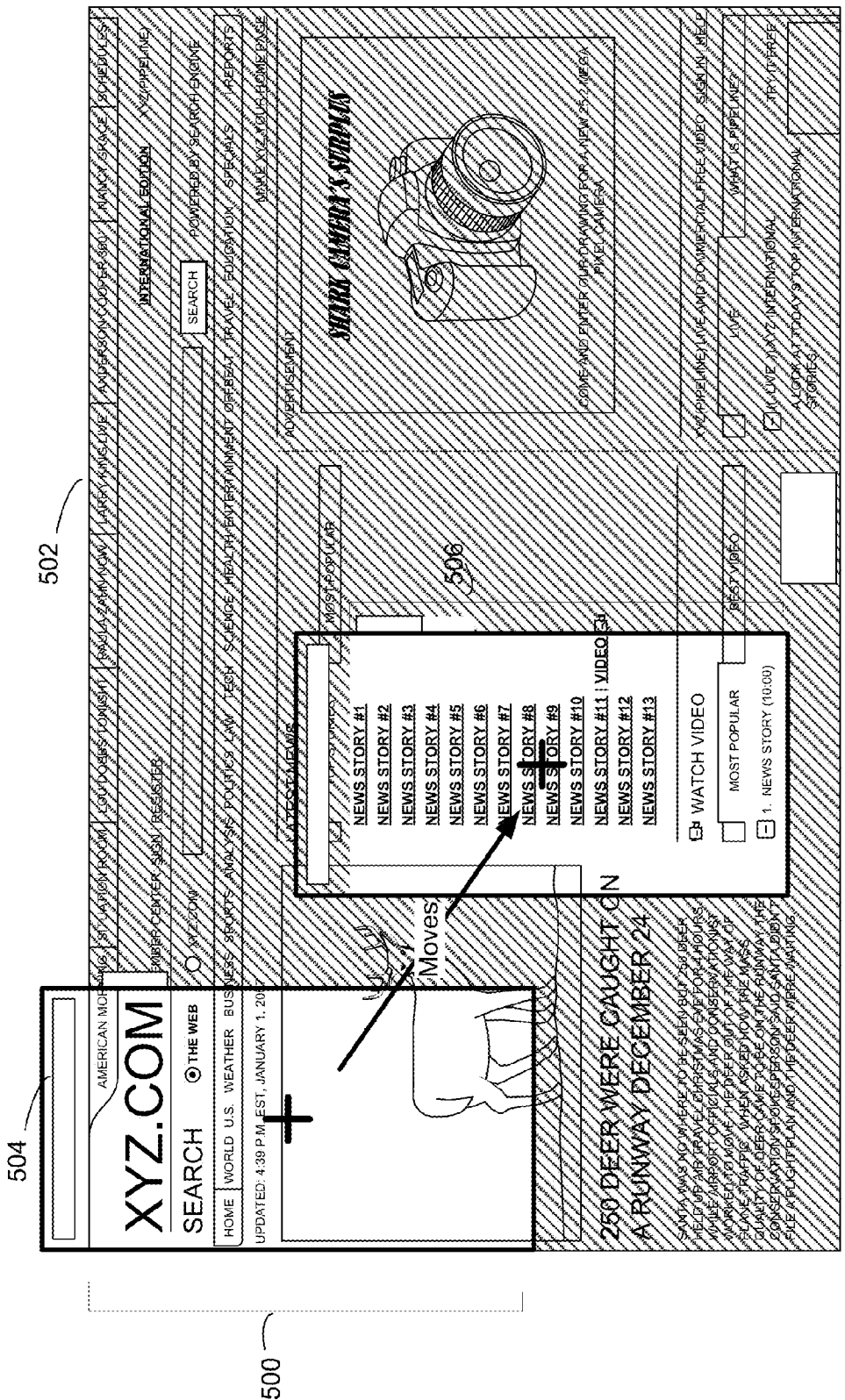
FIG. 5 is an exemplary display of a graphical user interface, in accordance with an embodiment of the present invention, for applying a content navigational mode to a two-dimensional content display screen feature.

In one embodiment, a content display screen feature is provided in a two-dimensional format (e.g., rendered by a two-dimensional rendering engine). In such an embodiment, the content display screen feature can maintain a virtually fixed position upon moving a device along an axis or axes (e.g., an x-axis, a y-axis, and/or a z-axis). By way of example, with reference to FIG. 4A, assume a user views a first portion 400 of a content display screen feature 402 comprising a two-dimensional list. Further assume the device 404 is moved to the right (e.g., along the x-axis) while a content navigational mode is applied to the device 404. As shown in FIG. 4B, the content display screen feature 402 remains virtually fixed, and the user is provided with a view of a third portion 406 of the content display screen feature 402. By way of further example, with reference to FIG. 5, assume a user views a first portion 500 of a content display screen feature 502 comprising a webpage. Assume the device 504 is moved towards the user (e.g., along the z-axis) and to the right (e.g., along the x-axis) while the device 504 is in content navigational mode. As shown in FIG. 5, the content display screen feature 502 remains virtually fixed, and the user is provided with a view of a second portion 506 of the content display screen feature 502.

Alternatively or in addition to maintaining a virtually fixed position upon device movement along an axis or axes, the content display screen feature can maintain a virtual fixed position upon rotation of a device about an axis or axes (e.g., rotating the device about an x-axis, a y-axis, and/or a z-axis). By way of example only, and with reference to FIGS. 6A-6B, a content display screen feature remains virtually fixed upon a rotational device motion. More specifically, with reference to FIG. 6A, assume a user views a content display screen feature 600 comprising a webpage. Assume a device 602 is rotated counterclockwise (e.g., about a z-axis) while a content navigational mode is applied to the device 602. As shown in FIG. 6B, the content display screen feature 600 (i.e., the webpage) remains virtually fixed while the device 602 is rotated counterclockwise. In embodiments, a selector 604 can rotate in accordance with the rotational device motion or, alternatively, remain virtually fixed.

Figure 7A:
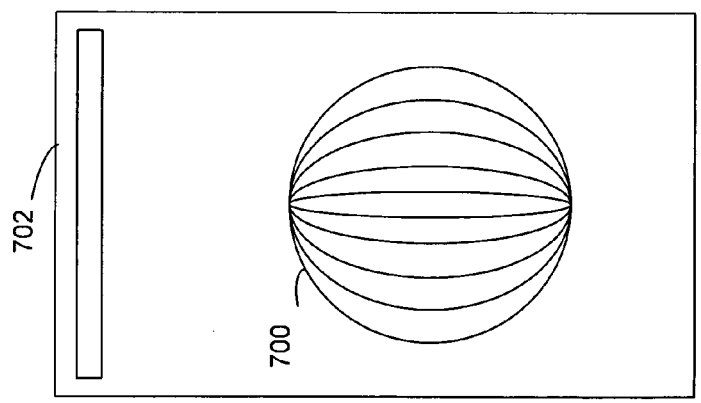
FIG. 7A is a first display of a graphical user interface for applying a content navigational mode based on a three-dimensional rotational device motion, in accordance with an embodiment of the present invention.
Figure 7B:
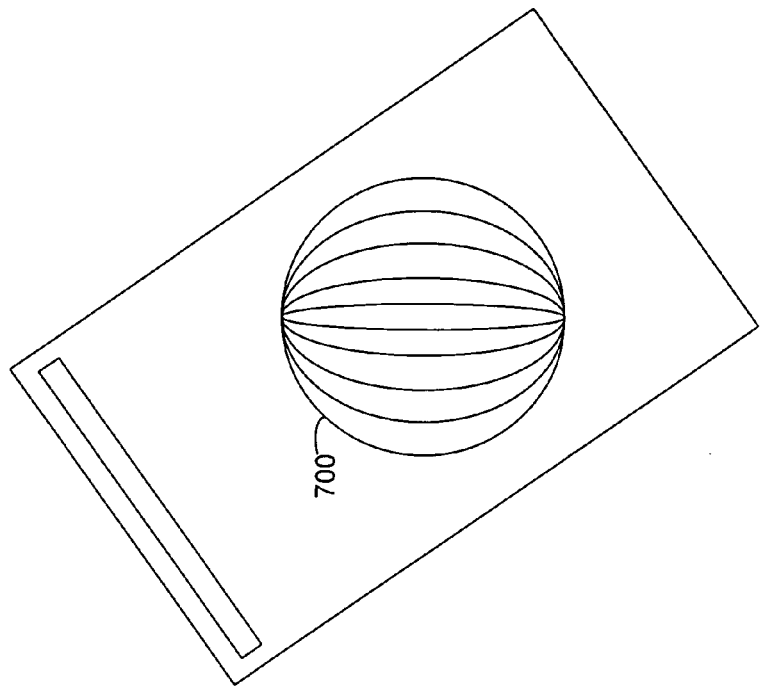
FIG. 7B is a second display of a graphical user interface for applying a content navigational mode based on a three-dimensional rotational device motion, in accordance with an embodiment of the present invention.
Figure 7C:
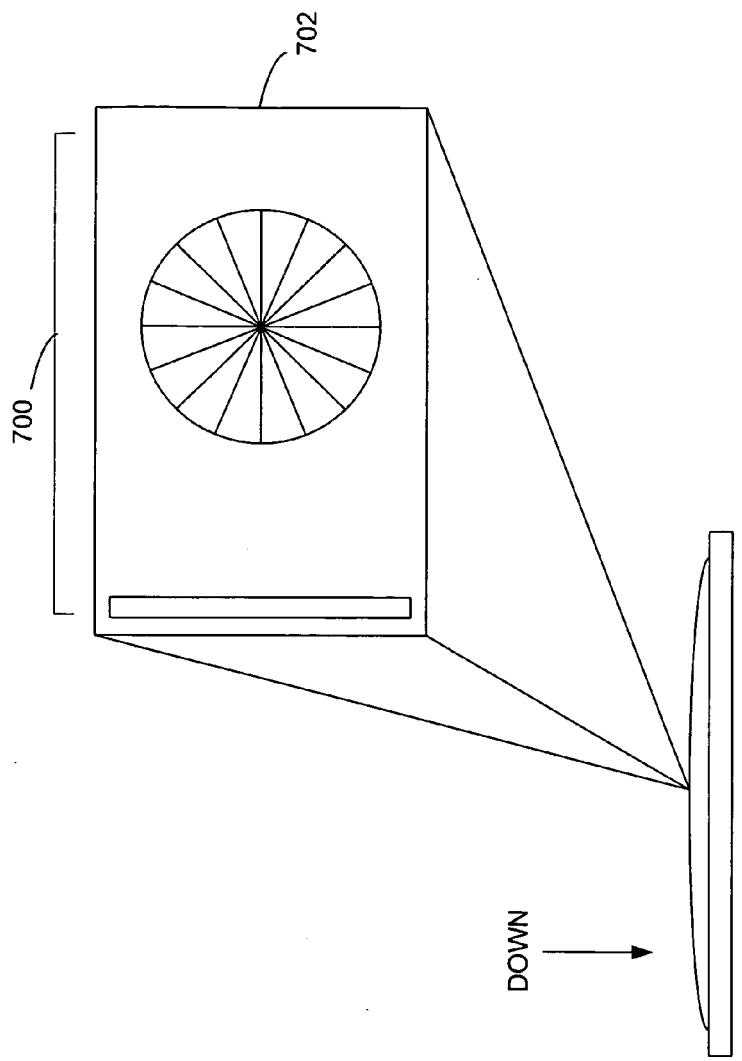
FIG. 7C is a third display of a graphical user interface for applying a content navigational mode based on a three-dimensional rotational device motion, in accordance with an embodiment of the present invention.

In another embodiment, a content display screen feature is provided in a three-dimensional format (e.g., rendered by a three-dimensional rendering engine). In such an embodiment, the content display screen feature can maintain a virtually fixed position upon device motion on and/or about an axis or axes (e.g., x-axis, y-axis, and/or z-axis). For example, and with reference to FIGS. 7A-7C, assume a user views a content display screen feature 700 of FIG. 7A comprising a three-dimensional image. Assume a device 702 is rotated counterclockwise while a content navigational mode is applied to the device 702. As shown in FIG. 7B, the content display screen feature 700, i.e., the image, remains virtually fixed. Assume further that the device is rotated about the x-axis, y-axis, and z-axis while a content navigational mode is applied to the device 702. As shown in FIG. 7C, the content display screen feature 700 remains virtually fixed even though the device 702 rotated about the axes.

One skilled in the art will appreciate that manipulating a content display screen feature provided in a three-dimensional format can include moving a device along an x-axis, y-axis, and/or z-axis; rotating a device about an x-axis, y-axis, and/or z-axis; or a combination thereof. In one embodiment, rotating a device about an x-axis, y-axis, and/or z-axis results in rotating around the center of the content display screen feature, as illustrated in FIGS. 7A-7C. Alternatively, a three-dimensional device motion may result in "free" movement. That is, the device may display content facing outwardly from an object.

Any number of navigational modes may be utilized by a device to manipulate one or more display screen features. For example, assume a device utilizes a single navigational mode to manipulate a particular display screen feature in response to a device motion. In such a case, each device motion can result in manipulation of the particular display screen feature. Alternatively, assume a device utilizes multiple navigation modes to manipulate display screen features in accordance with device motion. In such a case, the navigational mode applied to the device can be modified based on user input (e.g., user selection of a navigational mode), an occurrence of an event (e.g., change of content presented), a lapse of a time or time duration, or the like. For example, assume that initially a focus navigational mode is applied to a device such that each device motion results in manipulation of a focus display screen feature. Further assume that a user selects (e.g., selects a button) to change the navigational mode applied to the device from the focus navigational mode to a content navigational mode. Accordingly, upon selection of a content navigational mode, or indication thereof, each device motion results in manipulation of a content display screen feature.

Notwithstanding a navigational mode applied to a device (e.g., focus navigational mode, selector navigational mode, or content navigational mode), the device, or a portion thereof, can manipulate a display screen feature in a number of manners including, but not limited to, a discrete manipulation, a continuous manipulation, a selection manipulation, a rotational manipulation, a translational manipulation, a zoom manipulation, a combination thereof, or the like. A discrete manipulation refers to manipulating a display screen feature discretely, e.g., in portions. That is, the display screen feature moves in distinct portions. One skilled in the art will recognize that the portions may be of any size or dimension. For example, referring again to FIG. 4A, assume a user initially views only a first portion 400 of a content display screen feature 402 comprising a two dimensional list. Assume the device 404 is moved to the right (e.g., along the x-axis) while a content navigational mode is applied to the device 404. As shown in FIG. 4B, where a content display screen feature is discretely manipulated, the content display screen feature 402 is manipulated such that a third portion 406 of the content display screen feature 402 is displayed.

Figure 4C:
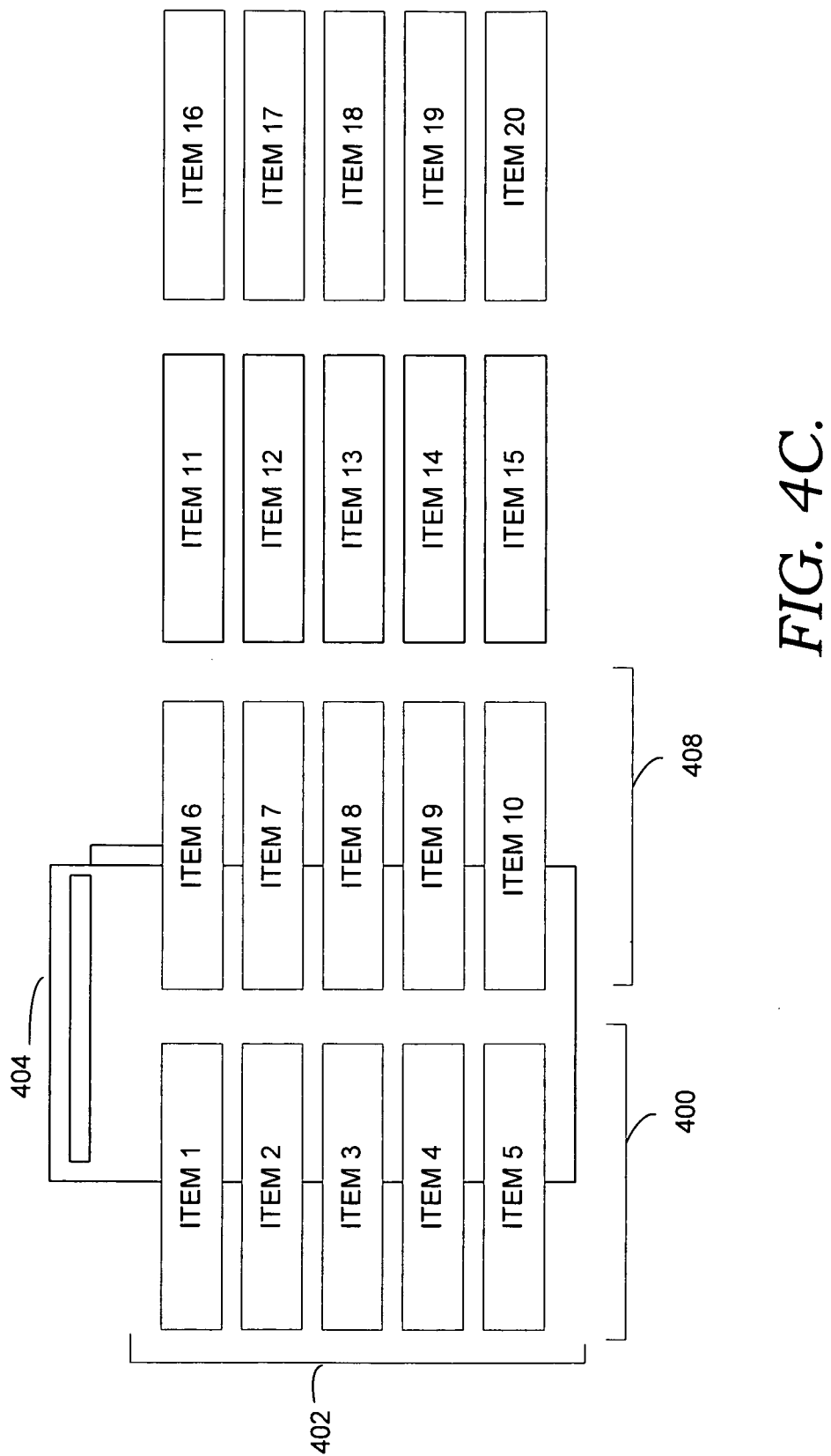
FIG. 4C is a third display of a graphical user interface for applying a content navigational mode, in accordance with an embodiment of the present invention.

A continuous manipulation refers to manipulating a display screen feature continuously. For example, with continued reference to FIG. 4A, assume a user initially views a first portion 400 of a content display screen feature 402 comprising a two dimensional list. Assume the device 404 is moved to the right (e.g., along the x-axis) while a content navigational mode is applied to the device 404. As shown in FIG. 4C, when a display screen feature is continuously manipulated, the content display screen feature 402 is continuously manipulated such that a portion of both a first portion 400 and a second portion 408 of the content display screen feature 402 is displayed.

One skilled in the art will appreciate that a display screen feature can be manipulated in a one-to-one proportion, one-to-many proportion, or a many-to-one proportion. A one-to-one proportion refers to manipulation of a display screen feature that directly corresponds with the motion of a device (e.g., magnitude of motion). For example, assume a device is moved one inch in an embodiment where a one-to-one proportion is employed. In such a case, the display screen feature is manipulated the same distance, i.e., one inch. A one-to-many proportion or a many-to-one proportion refers to manipulation of a display screen feature based on a ratio of the motion of a device. By way of example, assume a device is moved one inch in an embodiment where a one-to-many proportion or many-to-one proportion is employed. In such a case, the display screen feature is manipulated based on a ratio of the motion of the device, such as, for example, one-half of an inch or two inches.

A selection manipulation refers to manipulating a display screen feature by navigating a display screen to present additional or alternative content based on a selection of an aspect (e.g., a selectable link) of a content display screen feature. In embodiments, a focus display screen feature or a selector display screen feature is utilized to provide such a selection. A selection may occur upon a device action event on a selectable item, e.g., user contacts a key (e.g., a touch key or hard key) or releases a key to select a selectable item while the selector hovers over the selectable item. In one embodiment, the selection manipulation might be used to simply select a selectable item presented within the display screen, such as text, a hyperlink, an image, a video, a value, or the like. In another embodiment, the selection manipulation might be used to select an item and drag the item. Such a select and drag function may be used, for example, in a desktop setting to drag an application or document to the "trash."

A rotational manipulation refers to manipulating a display screen feature about an axis or axes (e.g., x-axis, y-axis, and/or z-axis). A device can be configured to detect and utilize device motions to rotate a display screen feature. Rotational manipulation of a display screen feature might be based on, for example, time, direction, degree, acceleration, angular acceleration, velocity, angular velocity, angular momentum, angular displacement, combinations thereof, and the like. In one embodiment, a rotational manipulation of a display screen feature occurs in response to a rotational motion (i.e., rotation of a device about an axis), a directional motion, a gesture motion, or the like.

A translational manipulation refers to manipulating a display screen feature along an axis or axes (e.g., an x-axis, y-axis, and/or z-axis). That is, a display screen feature might be moved laterally, up, down, forward, backward, diagonally, and the like. A device can be configured to detect and utilize motion of a device (e.g., movement along an x-axis and/or a y-axis) to manipulate a display screen feature. Translational manipulation of a display screen feature might be based on direction, distance, time, velocity, acceleration, a combination thereof, or the like, associated with the device motion. For example, a speed of device motion might correspond with a speed at which a display screen feature is translated. In one embodiment, a translational manipulation of a display screen feature occurs in response to a directional motion, rotational motion, a gesture motion, or the like.

A zoom manipulation refers to manipulating a display screen feature along an axis (e.g., a z-axis) such that a zoom effect results. That is, a zoom effect, such as a zoom in (i.e., enlarge) or a zoom out (i.e., shrink), applies to a display screen feature. A device can be configured to detect and utilize motions (e.g., movement of a device along an axis, such as a z-axis) to manipulate a display screen feature. Zoom manipulations of a display screen feature might be based on, for example, a direction, a distance, a time, a velocity, an acceleration, a combination thereof, or the like, associated with a device motion. For example, speed of a device motion might correspond with a speed at which a display screen feature is enlarged. In one embodiment, a zoom manipulation occurs in response to a directional motion, a rotational motion, a gesture motion, or the like.

Figure 8A:
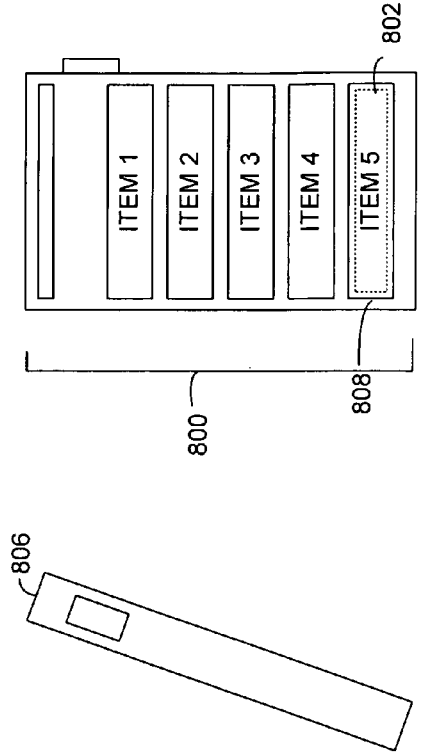
FIG. 8A is a first display of a graphical user interface, in accordance with an embodiment of the present invention, for utilizing rotation device motion to manipulate a display screen feature.
Figure 8B:
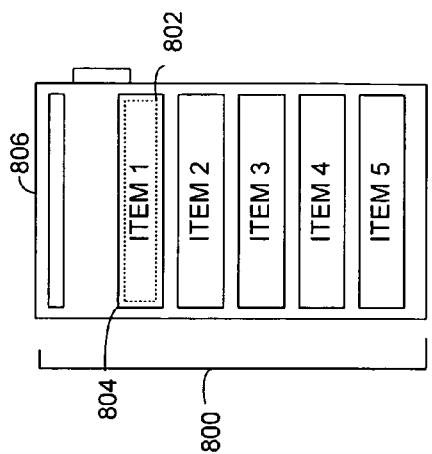
FIG. 8B is a second display for utilizing rotation device motion to manipulate a display screen feature, in accordance with an embodiment of the present invention.
Figure 8C:
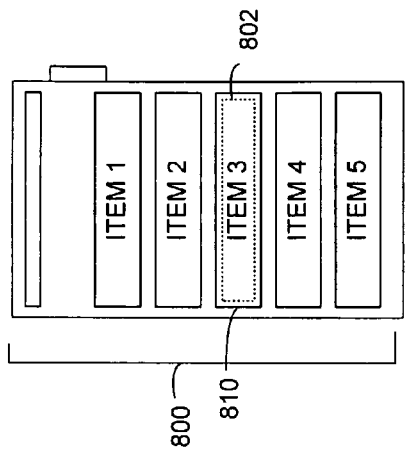
FIG. 8C is a third display of a graphical user interface for utilizing rotation device motion to manipulate a display screen feature, in accordance with an embodiment of the present invention.
Figure 8D:
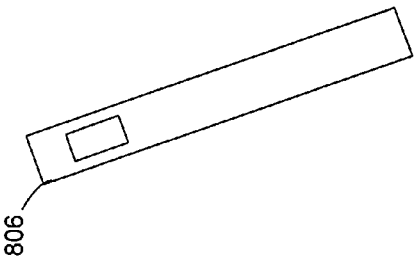
FIG. 8D is a fourth display for utilizing rotation device motion to manipulate a display screen feature, in accordance with an embodiment of the present invention.
Figure 8E:
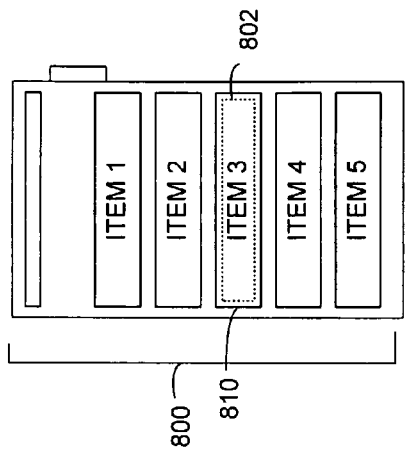
FIG. 8E is a fifth display of a graphical user interface for utilizing rotation device motion to manipulate a display screen feature, in accordance with an embodiment of the present invention.

One skilled in the art will appreciate that a device can be configured so that any device motion(s) can result in such rotational, translational, selection, and zoom manipulations. For example, in some embodiments, a display screen feature can be rotated, translated, or zoomed in or out based on a gesture device motion. A gesture may comprise, for example, a brisk movement in a specific direction, a device shake, a movement in a specific pattern, and a combination thereof. For instance, upon recognizing a flick of a device, a display screen feature may be manipulated, such as, for example, by rotating or translating the display screen feature. By way of further example, a detected rotation device motion can result in a directional manipulation. With reference to FIG. 8A, assume a user views a content display screen feature 800 comprising a vertical list. A focus display screen feature 802 is focused on the first item 804 within the content display screen feature 800. Assume the top portion of the device 806 is tilted away from the user, as shown in FIG. 8B. In such a case, as shown in FIG. 8C, the focus display screen feature 802 is manipulated such that the focus display screen feature 802 is focused on the fifth item 808 within the content display screen feature 800. Assume further that the top portion of the device 806 is rotated towards the user, as shown in FIG. 8D. In such a case, as shown in FIG. 8E, the focus display screen feature 802 is manipulated such that the focus display screen feature 802 is focused on the third item 810 within the content display screen feature 800.

Any number of manipulations can be applied to a display screen feature based on one or more device motions. For example, a user may move the device to the left (e.g., along the x-axis), which in turn manipulates the display screen feature. Thereafter or concurrently, the user may rotate the device about the x-axis to manipulate the display screen feature accordingly. Further, such manipulations can be utilized with respect to two-dimensional or three-dimensional content.

Referring again to FIG. 1, an exemplary computing system 100 for manipulating a display screen feature in accordance with one or more device motions may include a motion-data referencing component 110, a manipulation-indicator identifying component 120, and a feature manipulating component 130. In some embodiments, one or more of the illustrated components may be implemented as one or more stand-alone applications. In other embodiments, one or more of the illustrated components may be integrated directly into an operating system or an application of a server and/or a device, or other equipment associated therewith. It will be understood by those of ordinary skill in the art that the components illustrated in FIG. 1 are exemplary in nature and in number and should not be construed as limited. Any number of components may be employed to achieve the desired functionality within the scope of embodiments hereof.

The motion-data referencing component 110 is configured to reference one or more motion data. Motion data, as used herein, refers to any data that indicates motion, such as speed, distance, and direction, of a device (i.e., device motion). Such motion data can be utilized to determine manipulation of a display screen feature. Motion data can include, but is not limited to, acceleration data, angular acceleration data, velocity data, angular velocity data, distance data, degree change data, angular displacement data, torque data, angular momentum data, motion time data (e.g., a time of a device motion), motion duration data (e.g., a time duration of a device motion), motion direction data (e.g., a direction of a device motion), motion magnitude data (e.g., magnitude of motion, such as distance, etc.), vector data, components associated therewith (e.g., vector components), combinations thereof, or the like. In embodiments, motion data might result from device motion along or about an x-axis, y-axis, and/or z-axis. Motion data may be referenced automatically (i.e., without user intervention). Such automatic reference might occur continuously, periodically (e.g., at predetermined time intervals or over predetermined time intervals); based on an occurrence of an event (e.g., detection and/or output of motion data); or the like.

In one embodiment, motion data is detected utilizing any motion detector that can detect motion including, for example, an accelerometer, a gyroscope, a magnetometer, an electronic compass, a global positioning system (GPS), a camera, a hand jitter reduction technology, a combination thereof, and the like. Such motion detectors can be integrated with the design of the device such that the device housing incorporates one or more motion detectors. For example, assume a device utilizes an accelerometer to detect motion. In such a case, the accelerometer may be enclosed within the device housing. On the other hand, assume a device utilizes a camera to detect motion. In such a case, the camera may be positioned such that a portion of the camera is exposed to capture images. Alternatively, such motion detectors can be positioned remote from the device.

One skilled in the art will appreciate that any number of motion detectors may be utilized to detect motion data. In one embodiment, a single motion detector might be used to detect motion of a device. In an alternative embodiment, multiple motion detectors might be used to detect motion of a device. For example, a device might include an accelerometer to detect motion along an axis or axes as well as a gyroscope to detect motion about an axis or axes. In embodiments, a motion detector can be configured to detect motion data corresponding to device motion along or about one axis, two axes, or three axes. That is, motion data may be detected for motion along and/or about an x-axis, a y-axis, a z-axis, or a combination thereof.

Notwithstanding the type of motion detector utilized to detect motion data, the motion detector can be calibrated to detect motion upon exceeding a certain threshold generally accepted as being representative of sufficient motion data. For example, if an accelerometer measures a certain acceleration, a signal may be generated by the detector. Similarly, motion detectors may respond to a particular time or time duration associated with the movement, and if a threshold value is reached within a particular time, or is measured within a particular range of values, a signal may be generated. As one skilled in the art can appreciate, the sensitivity of motion detectors implemented into a device can affect when a device motion is registered or detected. In embodiments, motion detectors can be configured to detect and/or output motion data continuously or periodically, such as, for example, over a predetermined time interval, at a predetermined time interval, or upon an occurrence of an event.

Motion-data referencing component 110 can be configured to reference motion data detected by one or more motion detectors. In one embodiment, motion-data referencing component 110 might reference raw data generated by one or more detectors. In such an embodiment, motion-data referencing component 110 might receive or retrieve motion data from one or more motion detectors. In some cases, a motion detector might only detect motion to be referenced by motion-data referencing component 110. For example, in an embodiment where a display screen feature is only manipulated in accordance with device motions along an x-axis and a y-axis, a motion detector might be configured to only detect such device motions. In other cases, a motion detector might detect all motion the detector is capable of detecting and, thereafter, motion-data referencing component 110 only references necessary motion data. In an alternative embodiment, such detected motion data might be stored in a storage device, such as motion data output from one or more motion detectors and stored momentarily, temporarily, or permanently. In such a case, motion-data referencing component 110 might receive or retrieve detected motion data from a storage device.

In one embodiment, referenced motion data might be derived, calculated, or determined. That is, motion data might be processed data (e.g. derived, calculated, or determined) such that the data can be utilized to determine manipulation of a display screen feature. In embodiments, motion data can be derived or calculated based on motion detected by one or more motion detectors. For example, assume a motion detector detects acceleration data. In such a case, the acceleration data may be utilized to calculate or derive distance data (e.g., a distance) associated with the device motion that indicates the distance the device moved. The derived distance can then be used to determine manipulation of a display screen feature. By way of further example, motion data, such as a magnitude and/or direction of a rotational motion can be determined utilizing an angle between a gravity vector and an orientation vector of the device. As a further example, motion data can be determined by separating a vector, such as a velocity vector or acceleration vector, into one or more components (e.g., vector components). Such components can, thereafter, be utilized to determine relative motion. One skilled in the art will appreciate that any algorithm and/or lookup technique might be utilized to calibrate, normalize, determine, calculate, and/or derive one or more motion data.

In an embodiment where motion data is derived, calculated, or determined, motion-data referencing component 110 might receive or retrieve motion data from another component that performs the processing. Alternatively, motion-data referencing component 110 might perform such processing. For example, data detected by one or motion detectors might be referenced and, thereafter, motion-data referencing component 110 might perform a particular calculation to obtain desired motion data.

In one embodiment, motion-data referencing component 110 is configured to reference one or more particular types of motion data, such as acceleration data, angular acceleration data, velocity data, angular velocity data, distance data, degree change data, torque data, angular momentum data, motion time data, motion duration data, motion direction data, and/or the like. That is, although a plurality of types of motion data might be detected, calculated, and/or stored, motion-data referencing component 110 may only reference a specific portion of the motion data. By way of example only, assume that an accelerometer detects motion along an x-axis, a y-axis, and a z-axis. In an embodiment where manipulation of a display screen feature is based on motion only along an x-axis and a y-axis, motion-data referencing component 110 might only reference detected accelerometer data that corresponds to device motion along the x-axis and the y-axis.

The manipulation-indicator identifying component 120 is configured to identify one or more manipulation indicators. A manipulation indicator, as used herein, provides an indication of a manipulation to apply to a display screen feature so that the display screen feature appears virtually fixed upon detection of a device motion. Such manipulations may include, for example, discrete, continuous, selection, rotational, translational, zoom, combinations thereof, or the like. In one embodiment, a manipulation indicator refers to a destination position to which a display screen feature should be moved. As such, a destination position provides an indication of a manipulation to apply to a display screen feature. That is, a display screen feature is to be manipulated such that it is moved or repositioned in accordance with the destination position.

In such an embodiment, a pixel location might be utilized to identify the destination position to which a display screen feature is to relocate. An x-coordinate, a y-coordinate, and/or a z-coordinate relative to an origin can be used to specify a destination pixel location. One skilled in the art will appreciate that an origin can be any location within a display screen. For instance, an origin corresponding with coordinate (0,0) might be positioned in the upper left-hand corner of a display screen. By way of example only, assume an origin having coordinate (0,0) is located in the upper left-hand corner of a display screen and that a destination is identified as a pixel corresponding with coordinate (100,100). In such a case, a manipulation indicator can be identified as destination (100, 100) to indicate that the display screen feature, or portion thereof, should be relocated to the destination position corresponding with pixel coordinate (100, 100). Alternatively, a range of pixels can be used to identify a destination position. One skilled in the art will appreciate that a destination position can be utilized to indicate a discrete manipulation, a continuous manipulation, rotational manipulation, a translational manipulation, a zoom manipulation, a combination thereof, or the like.

In an embodiment where a manipulation indicator comprises a destination position, the destination position can be determined utilizing an origination position of a display screen feature and one or more movement attributes (e.g., origination position plus movement equals destination position). Accordingly, in embodiments, manipulation-indicator identifying component 120 may be configured to reference an origination position of a display screen feature. An origination position of a display screen feature refers to a starting or current location of the display screen feature. In one embodiment, such an origination position equals the previous, most recent, or immediately preceding destination position. For example, assume at a first instance that a display screen feature is manipulated to arrive at a first destination position. Such a first destination position can thereafter be utilized as an origination position such that a second destination position can be determined. That is, the display screen feature is moved relative to a current position of the display screen feature. In such an embodiment, the manipulation-indicator identifying component 120 might reference such an origination position (e.g., the previous destination position). Alternatively, an origination position of a display screen feature may be determined using an algorithm, lookup system, or the like. In another embodiment, an origination position is a predetermined position, such as, for example, the center of the display screen. In such an embodiment, a display screen feature is moved relative to the predetermined origination position.

An origination position of a display screen feature might refer to a position of a point of a display screen feature. Such a point of a display screen feature may refer to, for example, a corner point of a display screen feature, a center point of a display screen feature, or the like. Alternatively, an origination position of a display screen feature can refer to a position of the display screen feature in its entirety or a position of a portion of the display screen feature.

A pixel location or a range of pixels may be used to identify an origination position of a display screen feature. For example, where an origination position of a display screen feature refers to a position of a point of a display screen feature, a pixel location can be used to identify an origination position of a display screen feature. In such a case, an x-coordinate, a y-coordinate, and/or a z-coordinate relative to an origin can be used to specify a pixel location indicating an origination position of a display screen feature. Alternatively, where an origination position of a display screen feature refers to a position of the display screen feature in its entirety, or a portion thereof, a range of pixels can be used to identify an origination position of a display screen feature. As such, a range of pixels along an x-coordinate, a y-coordinate, and/or a z-coordinate might be utilized to identify an origination position of a display screen feature. For example, a display screen feature might be positioned at pixels 0 through 50 along an x-axis and 0 through 100 along a y-axis (e.g., located in the upper left-hand corner).

To identify a manipulation indicator comprising a destination, a movement from an origination position of a display screen feature can be utilized. That is, in addition to using an origination position, one or more movement attributes can also be utilized to determine a destination position. A movement attribute, as used herein, refers to any attribute that describes or indicates a movement associated with a display screen feature. As such, manipulating a display screen feature in accordance with a movement attribute results in a display screen feature being rendered in a subsequent condition, such as a destination position, based on a device motion or a device action event. Such attributes can comprise a value, text, a symbol, a combination thereof, or the like. A movement attribute can include, for example, a magnitude (e.g., distance, rotation, zoom, or the like), a direction for manipulating a display screen feature, a vector, a vector component, or the like. A magnitude attribute of a movement refers to a size or extent of a movement of a display screen feature. A distance magnitude attribute might be represented using any unit of measurement including, but not limited to, standardized measurements or other form of measurement. A standardized measurement includes, for example, an International System of Unit (e.g., centimeter or millimeters) or an Imperial Unit (e.g., inch). Other forms of measurement include, for example, a pixel quantity. A rotation magnitude attribute might be represented using degrees, angles, or the like. A zoom magnitude attribute might be represented by a number and/or designation of pixels to remove or add, a number and/or designation of pixels to occupy on a display screen, or the like. A direction attribute might be represented using any indication of direction including, but not limited to, left right, up, down, forward, backward, clockwise, counterclockwise, positive (+), negative (−), or the like.

The manipulation-indicator identifying component 120 can utilize one or more motion data to identify a magnitude attribute for manipulating a display screen feature. In one embodiment, a magnitude attribute for manipulating a display screen feature might correspond with motion data referenced by motion-data referencing component 110. By way of example only, assume motion data indicating that a device is moved one inch to the right is referenced by motion-data referencing component 110. The motion data can be referenced from a motion detector or calculated from motion detected by a motion detector. In such a case, the manipulation-indicator identifying component 120 employing a one-to-one manipulation proportion might identify the magnitude attribute to equal one inch. One skilled in the art will appreciate that, in embodiments, where a one-to-many or many-to-one proportion is employed, the magnitude attribute can be adjusted accordingly.

In some cases, a pixel quantity can be identified based on motion data and utilized to indicate a magnitude to manipulate a display screen feature. For example, assume motion data indicating that a device is moved one inch to the right is referenced by motion-data referencing component 110. The motion data can be referenced from a motion detector or calculated from motion detected by a motion detector. The manipulation-indicator identifying component 120 can utilize dots per inch (DPI) associated with the display screen to identify a pixel quantity for manipulation. Accordingly, where a display resolution is set to 154 DPI, one inch of device motion equals 154 pixels. In such a case where a pixel quantity can be identified to indicate a magnitude to manipulate a display screen feature, manipulation-indicator identifying component 120 might be configured to reference a DPI associated with the display screen or other data that can be utilized to identify a pixel quantity.

One or more motion data can also be used by manipulation-indicator identifying component 120 to identify a direction attribute for manipulating a display screen feature. In one embodiment, a direction for manipulating a display screen feature opposes a direction associated with motion data of the device referenced by motion-data referencing component 110. By way of example only, assume motion data, either detected or determined, indicating that a device is moved to the right is referenced by motion-data referencing component 110. In such a case, the manipulation-indicator identifying component 120 might identify the manipulation direction to be to the left. In an alternative embodiment, a direction for manipulating a display screen feature might correspond with a direction motion data referenced by motion-data referencing component 110 such that a manipulation direction is the same as indicated by the direction motion data.

Magnitude and direction attributes for manipulating a display screen feature can also correspond to rotational motion data and zoom motion data referenced by motion-data referencing component 110. For example, assume rotation motion data indicating that a device is rotated five degrees clockwise about the z-axis is referenced by motion-data referencing component 110. In such a case, the manipulation-indicator identifying component 120 employing a one-to-one manipulation proportion might identify a manipulation magnitude equal to five degrees and a manipulation direction to be counterclockwise.

By way of further example, assume motion data indicating that a device is moved away from a user along the z-axis is referenced by motion-data referencing component 110. In such a case, the manipulation-indicator identifying component 120 employing a one-to-one manipulation proportion might identify a manipulation zoom magnitude proportionate to the distance moved by the device. A zoom magnitude attribute can refer to the number and/or designation of pixels to remove, the number and/or designation of pixels to occupy on a display screen, and the like.

Motion data corresponding to a gesture can, in some embodiments, be used to identify a movement. In such an embodiment, manipulation-indicator identifying component 120 might be configured to recognize motion data generally accepted as comprising a gesture (e.g., brisk movement, device shake, and the like). Motion data might be generally accepted as comprising a gesture in instances where motion data exceeds a threshold, is within a range of data, or is comparable to predetermined data. Upon recognizing a gesture, a movement attribute, such as a magnitude and/or direction, can be associated with the gesture. The movement (e.g., magnitude and direction) associated with the gesture can then be identified as a movement to apply to a display screen feature.

In embodiments, upon referencing a current position of a display screen feature and identifying one or more movement attributes indicating a movement from a current position based on device motion, a destination to which a display screen feature should be moved can be identified. By way of example only, assume a point of a display screen feature is currently positioned at a pixel having a coordinate of (100, 100) relative to an origin (0, 0). Further assume that the display resolution is set to 154 DPI and that referenced motion data indicates that device moved one inch to the left. In such a case, a magnitude movement attribute from the current position is determined to equal 154 pixels, and a direction movement attribute is identified as to the right. Accordingly, a destination to which a display screen feature should be moved can be identified as the pixel location having a coordinate of (254, 100).

Manipulation-indicator identifying component 120 might be configured to modify a destination to which a display screen feature should be moved. In some cases, limitations might be imposed to incorporate manipulation boundaries. Manipulation boundaries provide limitations or restrictions for manipulating a display screen feature. Manipulation boundaries might be based on, for example, a display screen feature (e.g., size of the display screen feature), device settings (e.g., resolution), and the like. For example, assume a two-dimensional list is presented within a display screen of a device. In manipulating a selector display screen feature based on device motion, the selector display screen feature might be confined to movement within the display screen. As such, after the selector display screen feature approaches the edge of the display screen, the selector might be restricted from further movement in such a direction. Similarly, zoom manipulations and rotational manipulations may also have such manipulation boundaries that prevent a display screen feature from being further zoomed in/out or rotated.

In embodiments where manipulation boundaries are used to modify a destination, manipulation-indicator identifying component 120 might initially utilize one or more motion data to identify a destination to which a display screen feature should be moved. Upon identifying a destination, manipulation-indicator identifying component 120 can determine whether the identified destination exceeds any manipulation boundaries. If manipulation boundaries are exceeded, manipulation-indicator identifying component 120 may identify a modified destination to which a display screen feature should be moved. By way of example only, assume a display screen has a width of 500 pixels and a height of 500 pixels, which correspond with the manipulation boundaries. That is, a display screen feature is not to exceed the boundaries of the display screen. Further assume that a display screen feature has a current pixel location at (400, 400) and, upon a detected device motion, a destination of (600, 400) is identified. In such a case, manipulation-indicator identifying component 120 might recognize that the destination (600, 400) exceeds a manipulation boundary and thereby modify the destination of the display screen feature to (500, 400) so that the display screen feature is manipulated to the edge of the display screen.

In embodiments where discrete manipulation is utilized to manipulate a display screen feature, manipulation-indicator identifying component 120 might be configured to modify a destination to which a display screen feature should be moved. In such an embodiment, manipulation-indicator identifying component 120 can initially utilize one or more motion data to identify a destination to which a display screen feature should be moved. Upon identifying a destination, manipulation-indicator identifying component 120 may determine whether the identified destination is positioned within a discrete portion. If the identified destination is not within a discrete portion, manipulation-indicator identifying component 120 might identify a modified destination for the display screen feature. Such a modified destination may be a discrete portion, or point therein, nearest to the identified destination.

In some embodiments, a manipulation indicator might comprise one or more movement attributes, as described more fully above, to apply to a display screen feature. That is, a display screen feature may be manipulated in accordance with movement attributes. A movement attribute including, for example, a magnitude and/or a direction for manipulating a display screen feature, may be determined utilizing motion data, as discussed more fully above. In such a case, a display screen feature might be manipulated without regard to the current position and/or destination position. By way of example only, assume a point of a display screen feature is currently positioned at a pixel having a coordinate of (100, 100) relative to an origin (0, 0). Further assume that the display resolution is set to 154 DPI and that referenced motion data indicates that the device moved one inch to the left. In such a case, movement attributes are determined to equal 154 pixels to the right. Accordingly, manipulation-indicator identifying component 120 identifies manipulation indicators to apply to a display screen feature as 154 pixels to the right. In some cases, manipulation boundaries might be utilized to limit or restrict manipulations of a display screen feature. Although movement attributes are generally referred to as a magnitude and/or direction, one skilled in the art will appreciate that any attribute can be used to describe a movement or an action that, if a display screen feature is manipulated in accordance therewith, results in presentation of a display screen feature in a condition different than prior to the device motion or action event.

The feature manipulating component 130 is configured to manipulate a display screen feature. In one embodiment, feature manipulating component 130 manipulates a display screen feature in accordance with one or more manipulation indicators identified by manipulation-indicator identifying component 120. Such manipulations are displayed on the display screen associated with the device such that it appears as though a particular display screen feature remains in a virtually fixed position upon a device motion. In an embodiment where a manipulation indicator is described by a destination to which a display screen feature should be moved, the feature manipulating component 130 manipulates the display screen feature so that a display screen feature is displayed on a display screen at the identified destination. In an embodiment where a manipulation indicator is described by one or more movement attributes, the feature manipulating component 130 manipulates the display screen feature in accordance with the movement attribute(s) (e.g., magnitude and/or direction).

With reference to FIG. 9, a flow diagram is shown illustrating a method 900 for utilizing device motions to manipulate display screen features. Initially, as indicated at block 910, one or more motion data are referenced. The motion data provide an indication of a motion of a device. Thereafter, at block 920, one or more manipulation-indicators are identified. The manipulation indicators provide an indication of a manipulation to apply to a display screen feature. Such manipulations can be include rotational manipulations, directional manipulations, zoom manipulations, continuous manipulations, discrete manipulations, or a combination thereof. The manipulation indicators might be identified based on the one or more motion data. At block 930, the display screen feature is manipulated in accordance with the one or more manipulation indicators identified so that the display screen feature appears virtually fixed upon detection of a device motion.

Figure 10:
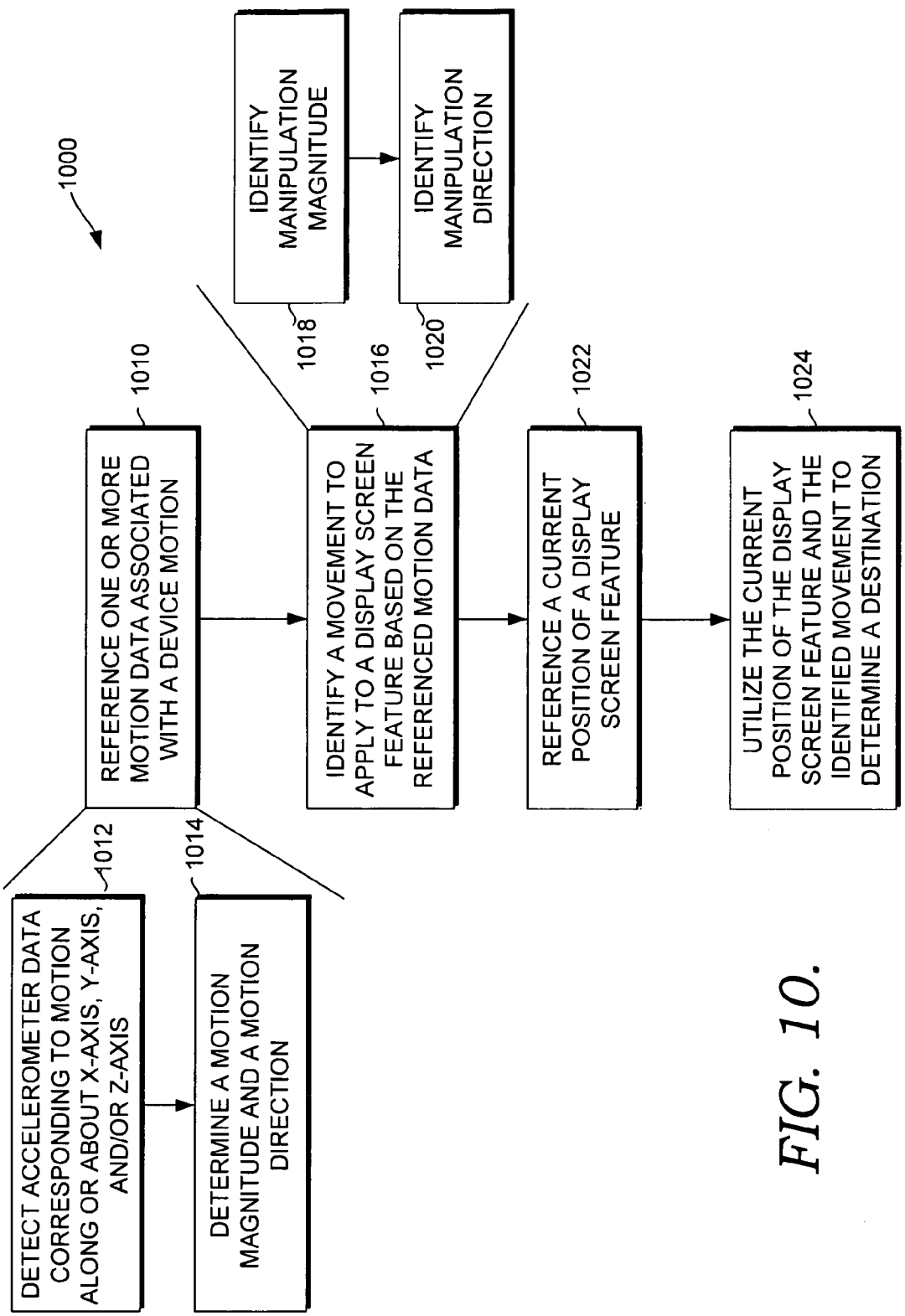
FIG. 10 is a flow diagram illustrating a second exemplary method for utilizing device motions to manipulate a display screen feature, in accordance with an embodiment of the present invention.

With reference to FIG. 10, a flow diagram is shown illustrating a method 1000 for utilizing device motions to manipulate display screen features. Initially, as indicated at block 1010, one or more motion data associated with a device motion are referenced. In one embodiment, to reference one or more motion data, accelerometer data corresponding to motion along or about an x-axis, a y-axis, and/or a z-axis are detected by one or more motion sensors. This is indicated at block 1012. Based on the accelerometer data, a motion magnitude and a motion direction associated with the device motion is determined, as indicated at block 1014. At block 1016, upon referencing one or more motion data, a movement to apply to a display screen feature is identified based on the one or more referenced motion data. In one embodiment, the movement comprises a manipulation magnitude and a manipulation direction. In such an embodiment, a manipulation magnitude is identified, as indicated at block 1018, and a manipulation direction is identified, as indicated at block 1020. In some cases, the manipulation magnitude might be identified as equal to the motion magnitude and the manipulation motion might be identified as opposing the motion direction. At block 1022, a current position of a display screen feature is referenced. Utilizing the identified movement and the current position of the display screen feature, a destination is determined at block 1024. A display screen feature can then be manipulated in accordance with the determined destination.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon that, when executed, perform a method for utilizing device motions to manipulate display screen features, the method comprising:

referencing one or more first motion data that provide an indication of a first motion of a portable device when a content navigational mode is applied to the portable device that results in manipulation of content on a display screen in response to motion of the portable device;

based on the one or more first motion data, identifying one or more first manipulation indicators that provide an indication of a manipulation to apply to a first display screen feature so that the display screen feature appears virtually fixed, wherein the first display screen feature comprises content viewable within a display screen of the portable device;

manipulating the first display screen feature in accordance with the one or more first manipulation indicators identified so that the first display screen feature appears virtually fixed;

receiving an indication to change a navigational mode applied to the portable device from the content navigation mode that manipulates content on the display screen based on motion of the portable device to a selector navigational mode that results in manipulation of a second display screen feature on the display screen in response to motion of the portable device, wherein the second display screen feature comprises a selector that is used to select selectable items within the first display screen feature, wherein the indication to change the navigational mode is received based on a first user selection of a button that is utilized to change the navigational mode between manipulating content on the display screen and manipulating the selector on the display screen in response to motion of the portable device;

manipulating the second display screen feature in accordance with one or more second manipulation indicators identified based on a second motion of the portable device so that the second display screen feature appears virtually fixed;

receiving an indication to change the navigational mode applied to the portable device from the selector navigational mode that results in manipulation of the second display screen feature on the display screen in response to motion of the portable device to the content navigation mode that manipulates content on the display screen based on motion of the portable device, wherein the indication to change the navigational mode is received based on a second user selection of a button that is utilized to change the navigational mode between manipulating the selector on the display screen to manipulating content on the display screen in response to motion of the portable device; and manipulating the first display screen feature in accordance with one or more third manipulation indicators identified based on a third motion of the portable device so that the first display screen feature appears virtually fixed.

2. The computer-readable media of claim 1, wherein the first motion of the portable device comprises a movement applied by a user and detected by the portable device.

3. The computer-readable media of claim 2, wherein the first motion comprises a lateral movement, a vertical movement, a zoom movement, a forward movement, a backward movement, a rotational movement, a gesture, or a combination thereof.

4. The computer-readable media of claim 2, wherein the first motion is detected by one or more motion detectors comprising an accelerometer, a gyroscope, a magnetometer, an electronic compass, a global positioning system, a hand jitter reduction technology, a camera, or a combination thereof.

5. The computer-readable media of claim 4, wherein the one or more motion detectors detect motion along an x-axis, a y-axis, a z-axis, or a combination thereof.

6. The computer-readable media of claim 4, wherein the one or more motion detectors detect motion about an x-axis, a y-axis, a z-axis, or a combination thereof.

7. The computer-readable media of claim 1, wherein the one or more first motion data comprise an acceleration data, an angular acceleration data, a velocity data, an angular velocity data, a distance data, a degree change data, a torque data, an angular momentum data, a motion time data, a motion duration data, a motion direction data, or a combination thereof.

8. The computer-readable media of claim 1, wherein the one or more first motion data comprise one or more motion data detected by one or more motion detectors.

9. The computer-readable media of claim 1, wherein the one or more first motion data comprise one or more motion data derived, calculated, or determined motion data based on motion detected by one or more motion detectors.

10. The computer-readable media of claim 1, wherein the one or more first manipulation indicators refer to a destination to which the display screen feature should be moved.

11. The computer-readable media of claim 1, wherein the one or more first manipulation indicators refer to a magnitude movement attribute and a direction movement attribute to apply to a display screen feature.

12. The computer-readable media of claim 1, wherein the one or more first manipulations result in a discrete manipulation, a continuous manipulation, a rotational manipulation, a directional manipulation, a zoom manipulation, or a combination thereof.

13. One or more non-transitory computer-readable media having computer-executable instructions embodied thereon that, when executed, perform a method for utilizing device motions to manipulate display screen features, the method comprising:
referencing a current position of a display screen feature, the display screen feature viewable within a display screen of a portable device;
identifying a movement to apply to the display screen feature based on one or more motion data that indicate a motion of the portable device;
utilizing the current position of the display screen feature and the movement to determine a destination to which the display screen feature should be moved such that the display screen feature appears virtually fixed upon a device motion;
identifying that the destination is not within any of a plurality of predefined discrete portions, wherein each of the predefined discrete portions comprises a unique area of background content;
determining a modified destination to which the display screen feature should be moved based on the destination not being within any of the plurality of predefined discrete portion, wherein the modified destination comprises a position within a discrete portion nearest to the destination; and
moving the display screen feature to the modified destination.

14. The one or more computer-readable media of claim 13, wherein the current position of the display screen feature comprises a pixel location of a point of the display screen feature at an instant prior to detection of the device motion for which the display screen feature is manipulated.

15. The one or more computer-readable media of claim 13, wherein the destination comprises a pixel location or range of pixels.

16. The one or more computer-readable media of claim 13, wherein the movement to apply to the display screen feature comprises a magnitude and direction corresponding with directional manipulation, a rotational manipulation, a zoom manipulation, or a combination thereof.

17. One or more non-transitory computer-readable media having computer-executable instructions embodied thereon that, when executed, perform a method for utilizing device motions to manipulate a display screen feature viewable within a display screen of a portable device, the method comprising:
referencing a motion magnitude and a motion direction corresponding with a motion of the portable device in three-dimensional space along or about an x-axis, a y-axis, a z-axis, or a combination thereof;
utilizing the motion magnitude and the motion direction to identify a manipulation magnitude and a manipulation direction associated with a manipulation to apply to a selector such that the selector appears as though fixed in space while the portable device moves in space, wherein the manipulation magnitude equals the motion magnitude, the manipulation direction opposes the motion direction, and the manipulation comprises a rotational manipulation, a directional manipulation, a zoom manipulation, or a combination thereof;
modifying the manipulation magnitude associated with the manipulation prior to applying to the selector based on a manipulation boundary that provides a restriction for manipulating the selector; and
manipulating the selector in accordance with the modified manipulation magnitude and the manipulation direction.

* * * * *